United States Patent [19]

Farr

[11] Patent Number: 4,846,533
[45] Date of Patent: Jul. 11, 1989

[54] HYDRAULIC ANTI-LOCK BRAKING SYSTEMS FOR VEHICLES

[75] Inventor: Glyn P. R. Farr, Warwickshire, England

[73] Assignee: Lucas Industries public limited company, Birmingham, England

[21] Appl. No.: 287,467

[22] Filed: Dec. 20, 1988

[30] Foreign Application Priority Data

Dec. 23, 1987 [GB] United Kingdom ............... 8729965

[51] Int. Cl.$^4$ ............................................... B60T 8/42
[52] U.S. Cl. ..................................... 303/113; 303/92; 303/116
[58] Field of Search ............ 188/181 A; 303/92, 113, 303/114, 115, 119

[56] References Cited

U.S. PATENT DOCUMENTS

| | | | |
|---|---|---|---|
| 4,457,563 | 7/1984 | Farr | 303/92 |
| 4,637,664 | 1/1987 | Arikawa | 303/113 X |
| 4,700,991 | 10/1987 | Nishimura et al. | 303/113 |
| 4,740,039 | 4/1988 | Hattwig | 303/113 X |

Primary Examiner—Duane A. Reger
Attorney, Agent, or Firm—Baker, Maxham, Jester & Meador

[57] ABSTRACT

An anti-lock hydraulic braking system includes a copy valve which is connected between two independent braking circuits, each incorporating a wheel brake and a respective one pressure space of a tandem master cylinder. The copy valve comprises a housing having a multi-stepped bore in which a piston of complementary outline is located, first and second inlet chambers connected to the respective pressure spaces, and first and second outlet chambers connected to respective brakes, are all defined between the piston and the bore. A valve assembly is adapted to control communication between the inlet chamber and the first output chamber, and between the output chamber and first expander chamber. The other output chamber is connected to a second expander chamber through an anti-lock modulator. The piston is arranged so that only a relatively small axial travel is required to operate the valve assembly, and such movement can be accommodated by flexure of seals on the piston.

12 Claims, 5 Drawing Sheets

HYDRAULIC ANTI-LOCK BRAKING SYSTEMS FOR VEHICLES

This invention relates to hydraulic anti-lock braking systems for a vehicle of the four wheel type in which the behaviour of a braked wheel is sensed by skid sensing means and at a skid point is operative to actuate an anti-lock modulator for modulating the supply of brake-applying fluid to the brake on that wheel to prevent that wheel from locking.

It is known to incorporate in an anti-lock braking system of the kind set forth a copy valve which is adapted to equalise the controlled pressure in two separate brakes in response to anti-lock control of one of the two brakes.

When an anti-lock braking system of the kind set forth has two independent brake circuits, each operated by pressure generated in a respective pressure space of an hydraulic master cylinder, the copy valve is also subjected to pressure from both master cylinder circuits to ensure that at least some of the brakes can be applied in the event of failure of one of the circuits, generally known as a "half system failed case".

When used in an anti-lock braking system of the kind set forth and known as the 'dump and pump type' in which fluid is dumped from a brake into an expander chamber and then pumped back into the master cylinder, one of the expander chambers is arranged to accommodate the volume from both rear wheel brakes and one front wheel brake, while the other caters for the remaining one front brake. This means that extra volume must be available within the master cylinder to cater for the failed case where the larger expander chamber is filled with fluid. This, therefore, increases the travel of a pedal for operating the master cylinder. In the other failed case the travel of the pedal is also increased because the master cylinder loses the travel associated with the larger volume requirement before the remaining circuit is operated.

Ideally, therefore, the expanders should be the same size so that the volume outputs of both the primary and secondary pressure spaces of the master cylinder are equal.

Known copy valves comprise an equalising or balance piston for equalising the pressures in the two circuits, an isolating valve for isolating the supply of brake applying fluid to the first circuit, and means adapted to ensure the operation of one of the circuits should the other circuit fail.

In such known copy valves the equalising piston is usually provided with a plurality of seals co-operating with the wall of the bore in which it works. The presence of such a number of seals makes it difficult to ensure that the pressures in both brake circuits can be balanced.

According to out invention, in an hydraulic anti-lock braking system of the kind set forth incorporating a tandem master cylinder having a primary pressure space, and a secondary pressure space, and a copy valve, the copy valve comprises a housing having a multi-stepped bore, a piston of complementary multi-stepped outline located in the bore, first and second separate inlet chambers defined in the housing between the piston and the bore, each connected to one of the pressure spaces, first and second separate output chambers also defined in the housing between the piston and the bore, each connected to a respective one of first and second brakes on the wheels of a corresponding pair, the first output chamber also connected to a first expander chamber, and a valve assembly adapted to control communication between the first inlet chamber and the first output chamber, and between the first output chamber and the expander chamber, the second output chamber being connected to a second expander chamber through the anti-lock modulator.

Normally the valve assembly isolates the first output chamber from the first expander chamber, whilst placing the first input chamber in communication with the first output chamber, and the modulator isolates the second output chamber from the second expander chamber.

If the modulator receives a skid signal from either braked wheel the modulator is operative to isolate the second output chamber from the second brake, and relieve the pressure from that brake to the second expander chamber, which upsets the balance of the piston so that it moves in a direction in turn to cause the valve assembly to isolate the first output chamber from the first brake, and relieve the pressure from the first brake to the first expander chamber.

When the wheels recover, the anti-lock modulator re-applies the second brake, the piston moves to isolate the first brake from the first expander and meters fluid from the master cylinder to increase the pressure applied to the first brake in proportion to the second brake.

The piston is arranged so that only a relatively small axial travel is required to operate the valve assembly and control the output pressure from the first output chamber.

This enables us to reduce or substantially eliminate piston seal movement during operation so that the two brake pressures are substantially equal.

Preferably piston movement is accommodated by flexure of the seals.

In one embodiment a modulator may be provided for each front wheel brake, a third modulator may be provided for both rear wheel brakes, and a motor driven twin pump may be provided to provide the energy to replenish the fluid released from the brakes at the termination of an anti-lock cycle. In such a layout the modulator for one front wheel is connected between the first inlet chamber and the first output chamber, the two remaining modulators are connected in parallel between the second inlet chamber and the second output chamber, and the twin pump is adapted to return fluid from the expander chambers to the appropriate brake circuit during anti-lock control Each expander chamber therefore accommodates the volume of one front brake and one rear brake. This means that the two circuits can be divided substantially equally so that in the half system failed case the same lost travel is experienced, irrespective of which of the two circuits fail.

Some embodiments of our invention are illustrated in the accompanying drawings in which.

Figure 1:
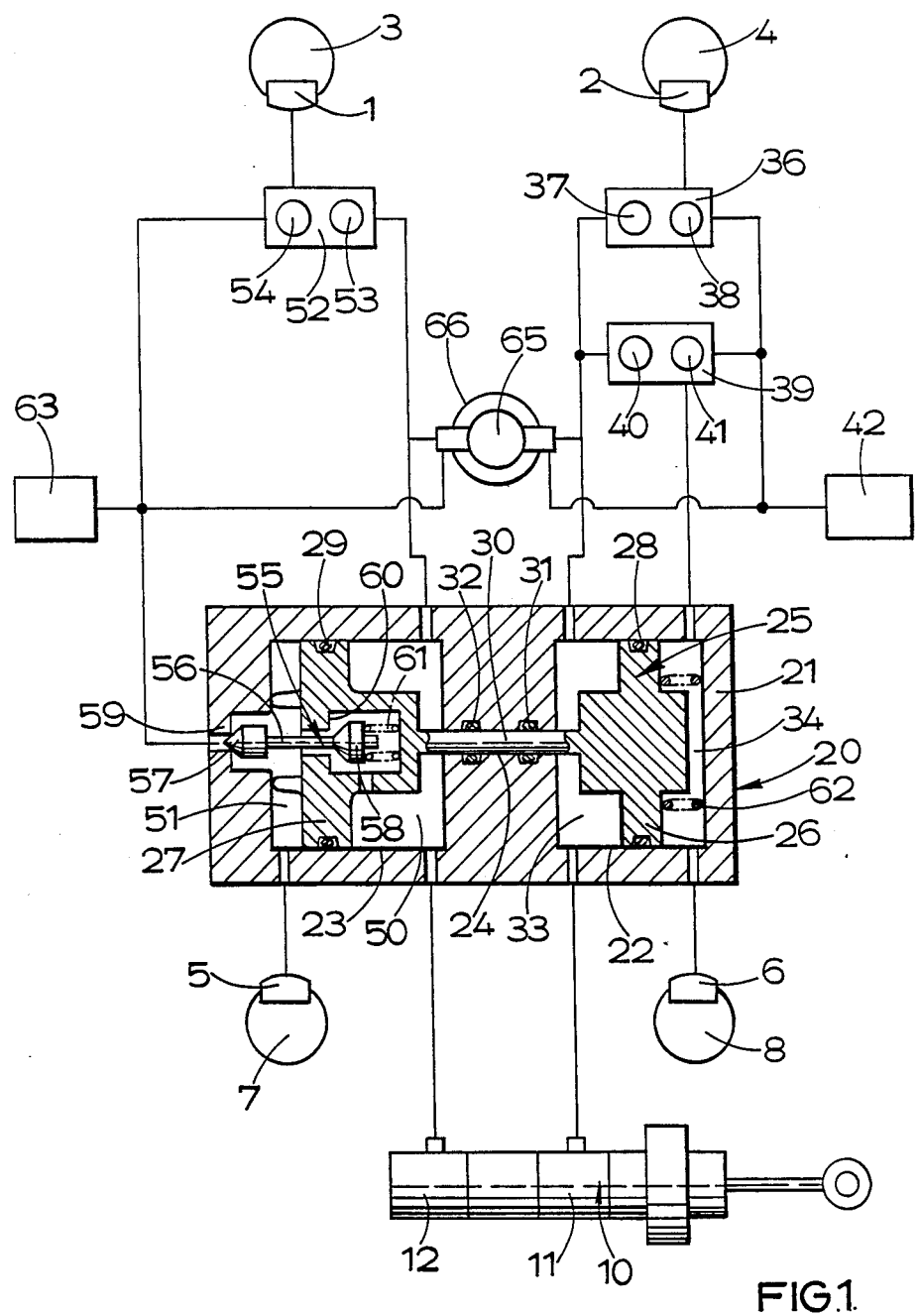
FIG. 1 is a layout of an hydraulic anti-lock braking system for a vehicle.

The anti-lock braking system illustrated in FIG. 1 of the accompanying drawings comprises brakes 1, 2 on the front wheels 3, 4 of a vehicle, and brakes 5, 6 on the rear wheels 7, 8 of the vehicle. The brakes 1, 2, 5, 6 are adapted to be applied hydraulically by a booster-assisted pedal-operated tandem master cylinder 10 having a primary pressure space 11, and a secondary pressure space 12. A primary braking circuit is constituted by the primary pressure space 11, and the brakes 2 and 6 on the wheels on the right hand side of the vehicle, and a secondary braking circuit is constituted by the pressure space 12, and the brakes 1, 5 on the wheels on the left hand side of the vehicle.

The two circuits are separate from each other, and a copy valve 20 is adapted, under conditions to be described, to equalise the pressures in the two circuits.

As illustrated the copy valve 20 comprises a housing 21 having a pair of longitudinally extending bores 22 and 23 of substantial, and of substantially equal, diameters which are interconnected by a third bore 24 of relatively small diameter. A piston 25 located in the housing 21 has at opposite ends enlarged portions 26 and 27 carrying seals 28 and 29 for sealing engagement with the bores 22 and 23, and an intermediate portion 30 of reduced diameter which is integral with the portions 26 and 27 and has a sealing engagement in spaced seals 31 and 32 in the bore 24.

Inner and outer chambers 33 and 34 are defined on opposite sides of the piston portion 26. The primary pressure space 11 is connected to the chamber 33, and the chamber 33, in turn, is connected to the front brake 2 through a first front anti-lock modulator 36 having an inlet valve 37 and an outlet valve 38. The inner chamber 33 is also connected to the outer chamber 34 through a rear wheel anti-lock modulator 39 having an inlet valve 40 and an outlet valve 41. Finally the rear brake 6 is connected to the outer chamber 34.

A primary expander chamber 42 is located on the downstream sides of the two outlet valves 38, 41.

Inner and outer chambers 50, 51, are defined in the housing 21 on opposite sides of the piston portion 27. The secondary pressure space 12 is connected to the chamber 50, and the chamber 50, itself, is connected to the front brake 3 through a second front anti-lock modulator 52 having an inlet valve 53 and an outlet valve 54.

A valve assembly 55 embodied in the piston portion 27 comprises a valve member 56 having axially spaced valve heads 57 and 58 for alternative engagement with a seating 59 in the housing which leads to the downstream side of the outlet valve 54, and a seating 60 in the piston portion 27, respectively.

Normally the valve head 57 is urged into engagement with the seating by means of a spring 61, and the piston 25 is urged into a balanced advanced position in engagement with the corresponding end of the housing by means of a spring 62 acting on the piston portion 26. This places the two chambers 50 and 51 in communication so that the rear brake 5 is connected to the master cylinder 10.

A secondary expander chamber 63 is disposed between the seating 59 and the outlet valve 54.

A double pump 65 driven by a motor 66 is adapted to draw hydraulic fluid from each expander chamber 42 and 63, and pump it to the respective primary and secondary master cylinder circuit.

Operation of each modulator 36 and 52 is initiated by a speed sensor associated with a respective front wheel 4, 3, and that of the modulator 39 with speed sensors associated with the rear wheels 7.

In normal operation the motor 66 is inoperative, the inlet valves 37, 41 and 53 are open, and the outlet valves 38, 41 and 54 are closed. The piston 26 is in the position shown with the head 57 in engagement with the seating 59, and the head 58 spaced from the seating 60.

When the master cylinder 10 is operated, fluid from the primary pressure space 11 is supplied through the inner chamber 33 to the brake 2 through the open inlet valve 37, and to the rear brake 6 through the open inlet valve 40 and the chamber 34. Fluid from the secondary pressure space 12 is supplied through the inner chamber 50 to the front brake 1 through the inlet valve 53 and to the rear brake 5 through the valve assembly 55 and the outer chamber 51.

Under these conditions the piston 26 is held in the balanced advanced position described above.

If a skid signal is received from either of the rear wheel sensors, the rear modulator 39 is actuated to close the inlet valve 40 to isolate the master cylinder from the rear brake 8, and then to open the outlet valve 41 to dump the fluid from the brake 6 to the primary expander chamber 42. This action unbalances the piston 26 of the copy valve 25 and the piston 26 moves in a direction relatively towards the spring 62 which causes the seating 60 initially to engage with the head 58 to isolate the secondary pressure space 12 from the brake 5, and subsequently to withdraw the head 57 from the seating 59 to dump the fluid from the brake 5 to the secondary expander chamber 63.

Fluid in the expander chambers 42 and 63 is pumped by the double pump 65 back to the respective primary and secondary pressure spaces 11, 12.

When the rear wheel recovers, the anti-lock modulator 39 is operative to re-apply the primary rear brake 6. The piston 25 moves to isolate the secondary rear brake 5 from its expander chamber 63 and meters fluid from the master cylinder 10 to increase the pressure applied to the secondary rear brake 5 in proportion to the primary rear brake pressure 6.

If a signal is received from either front wheel speed sensor the respective modulator 36, 52 is actuated to control the behaviour of that wheel, and the copy valve 20 is unaffected.

If, however, at least one of the front wheel brakes is controlled, say the brake 2, together with one of the rear brakes 5 or 6, both modulators 36 and 39 are actuated. The copy valve 20 operates as described above so that rear brake 5 is dumped to the expander chamber 63, and the fluid from the rear brake 6 is dumped to the expander chamber 42, together with the fluid from the front brake 2. These three brakes are therefore relieved. The twin pump 65 returns fluid from the expanders to the relevant master cylinder circuit.

If both front brakes 1, 2 and both rear brakes 5, 6 are controlled, brake fluid from each diagonal front and rear is connected to its own corresponding expander chamber during anti-lock control. Each expander chamber therefore accommodates the volume of one front brake and one rear brake. This means that the two primary and secondary brake circuits can be divided equally so that in a half failed case the same lost travel is experienced, irrespective of which of the circuits fails.

For example, should the primary circuit incorporating the modulator 39 fail, the pressure in the secondary pressure space 12 acts on the piston 25 in a direction to ensure that the seating 60 is spaced from the head 58.

This ensures that the rear brake 5 can be applied together with the front brake 1 which is supplied from the chamber 50.

Should the secondary circuit fail, the pressure in the pressure space 11 acts on the piston 25 and fluid flows through the modulator 39 to the rear brake 6 as normal.

Since the piston portions 26 and 27 are of substantial diameter, the movement of the piston 25 in its bore is relatively small. The seals 28, 29 are so arranged that they do not slide during an anti-lock control mode, but merely flex to accommodate the relatively small travel of the piston 25.

Figure 2:
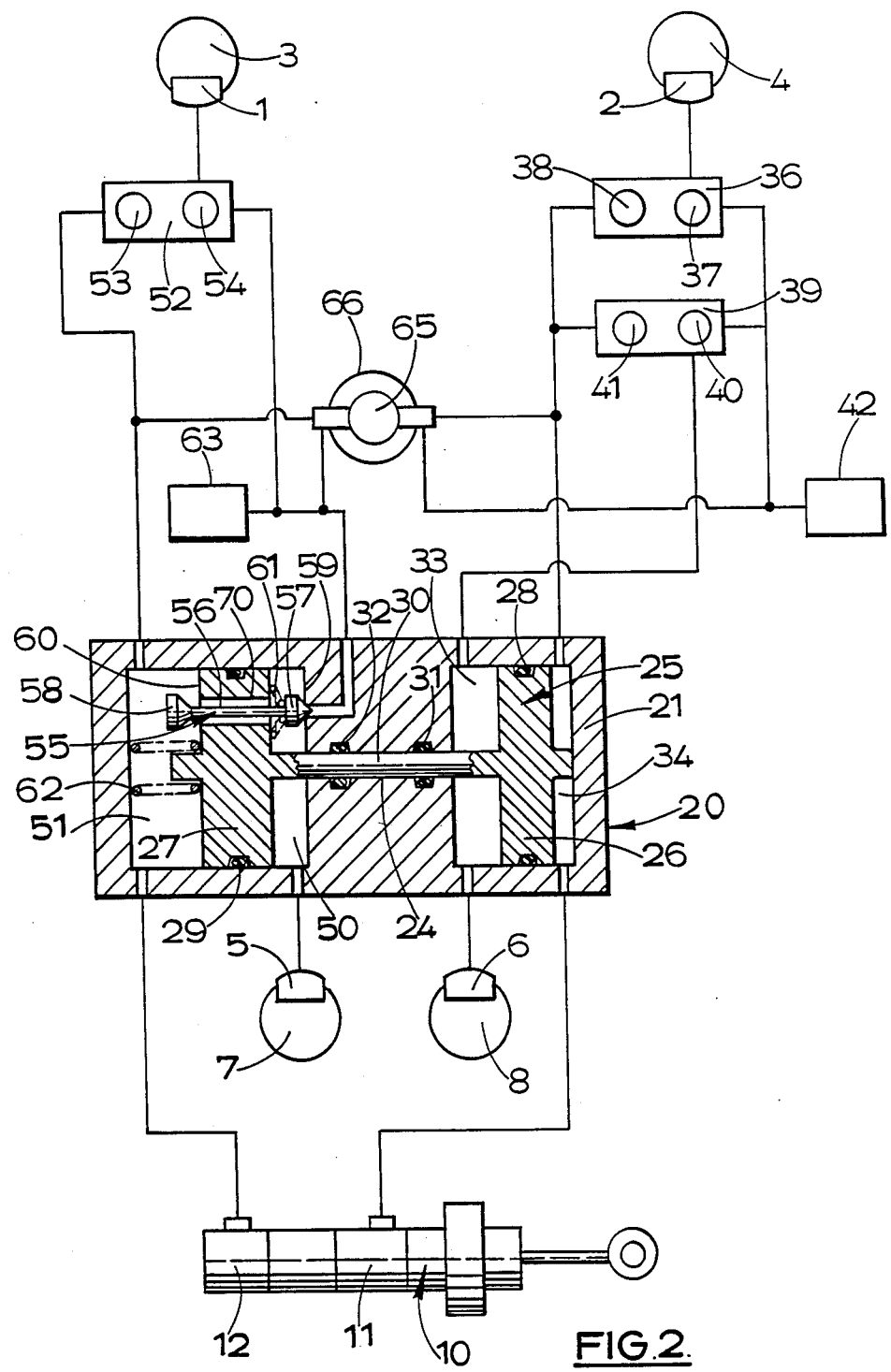
FIG. 2 is a layout similar to FIG. 1 but showing a modification.

In the braking system shown in the layout of FIG. 2, the copy valve 20 is modified so that the valve assembly 55 is re-positioned with the stem 56 extending through a radially displaced axial bore 70 in the piston portion 27 and the seating 59 being disposed in the housing 21 at the inner end of the chamber 50. The pressure spaces 11 and 12 are connected to the outer chambers 34 and 51 respectively, from which the front brakes 1, 2 are supplied, and the rear brakes 5, 6 are connected to the inner chambers 50 and 33 respectively.

The construction and operation of the system of FIG. 2 is otherwise the same as that of FIG. 1 and corresponding reference numerals have been applied to corresponding parts.

Figure 3:
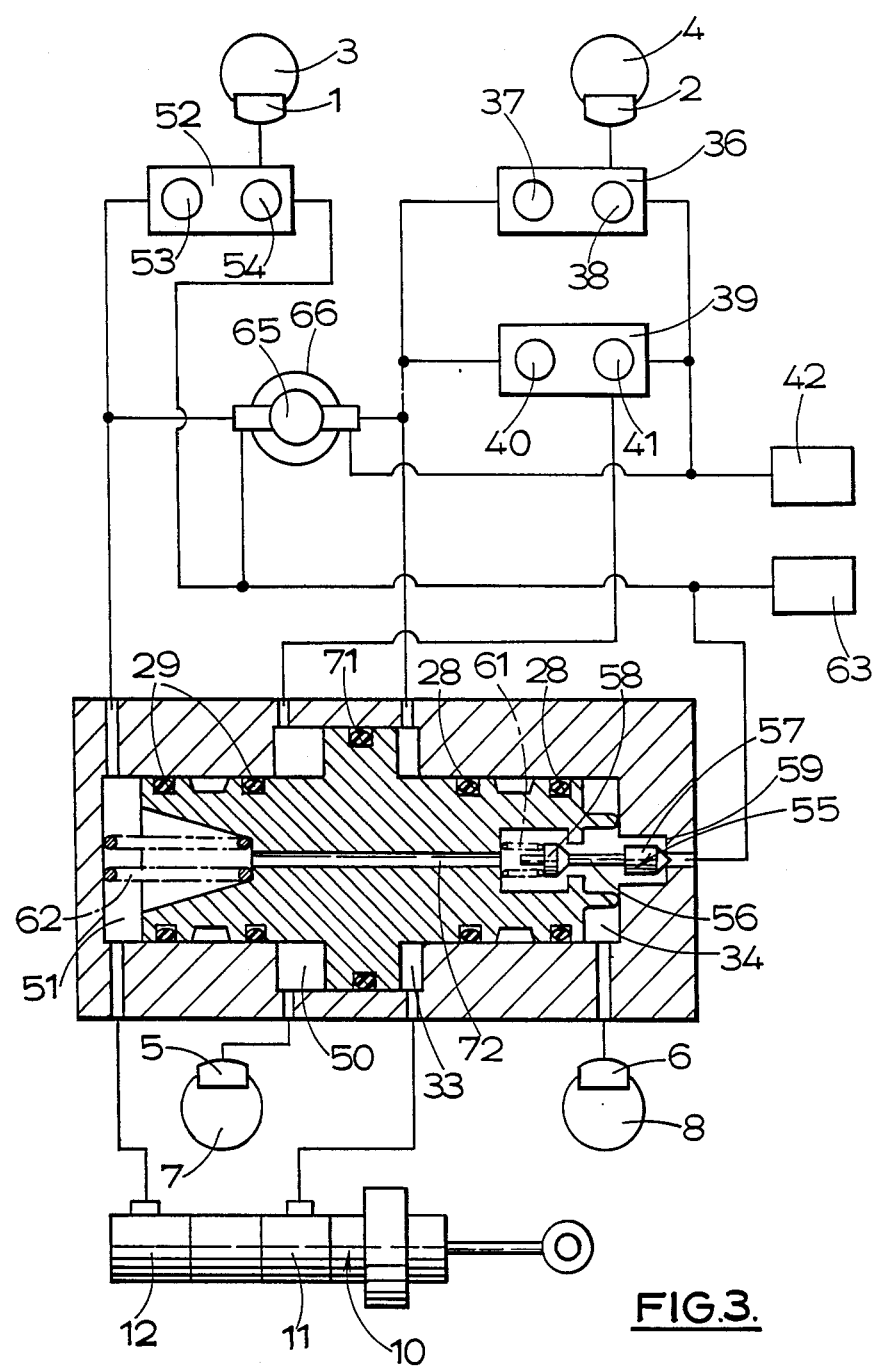
FIG. 3 is a layout of another anti-lock braking system.

In the layout of FIG. 3 the position of the piston 25 of the copy valve 20 is reversed in the bore with the seating 59 located in the opposite end of the housing. The piston portions 26, 27 are relatively reduced in diameter, and the intermediate portion 30 is increased to a diameter greater than that of the portions 26, 27 and carries a seal 71. The piston 25 has an axially extending through bore 72. The piston 25 is sized so that the central annular areas are substantially equal to the areas at each end.

The primary pressure space 11 and the brake 2 are connected to the inner chamber 33, the rear brake 6 to the outer chamber 34, the second pressure space 12 and the front brake 1 to the outer chamber 51, and the rear brake 5 to the inner chamber 50.

The construction and operation of the system of FIG. 3 is otherwise the same as that of FIG. 1, and corresponding reference numerals have been applied to corresponding parts.

Figure 4:
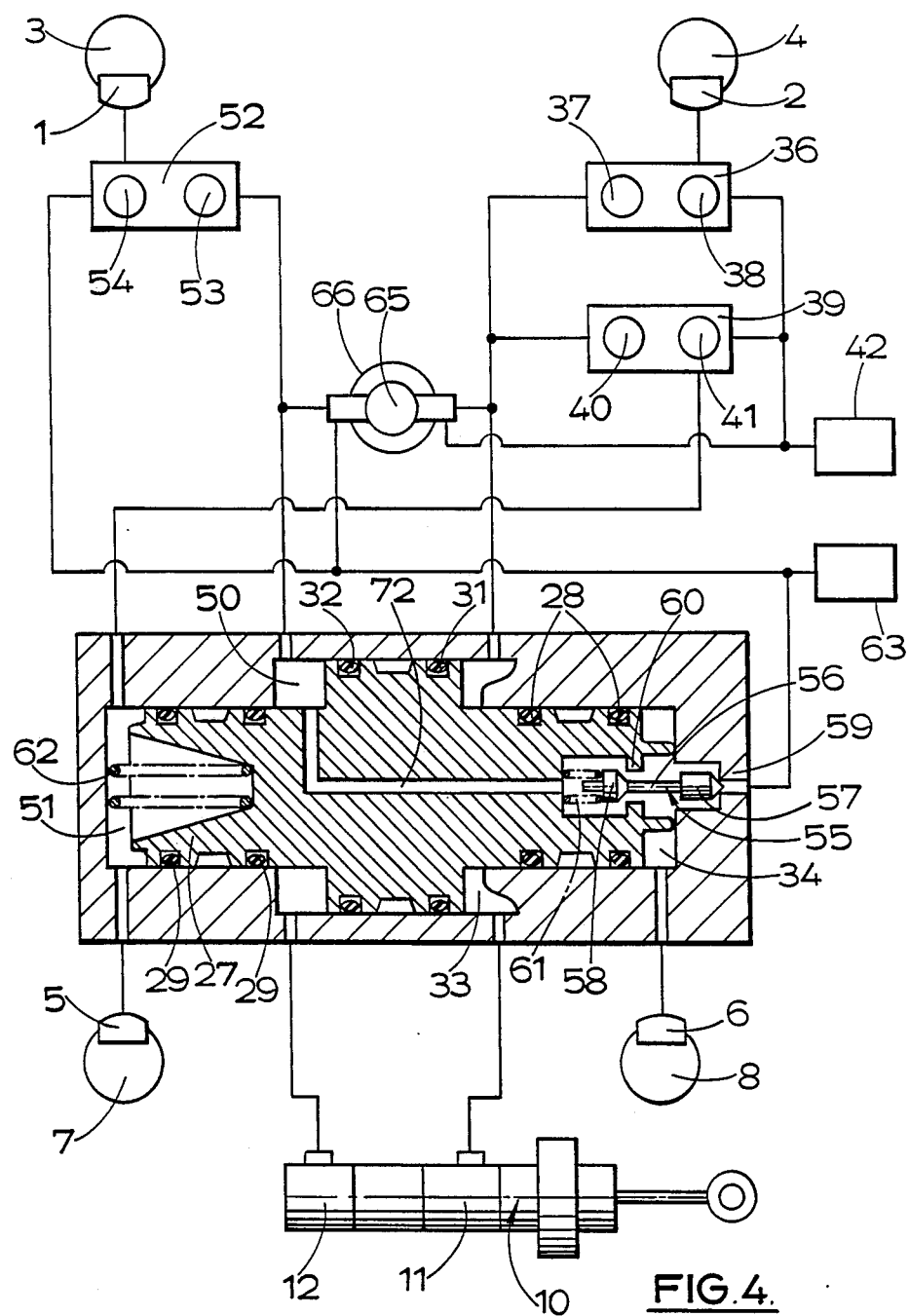
FIG. 4 is a layout similar to FIG. 3 but showing a modification.

The system shown in the layout of FIG. 4 is similar to FIG. 3 except that the bore 72 in the piston 25 leads from the valve assembly 55 and into the chamber 50 instead of straight through the piston. The connections to and from the inner chamber 50 and the outer chamber 51 are reversed in comparison with the arrangement of the connections in FIG. 3.

Figure 5:
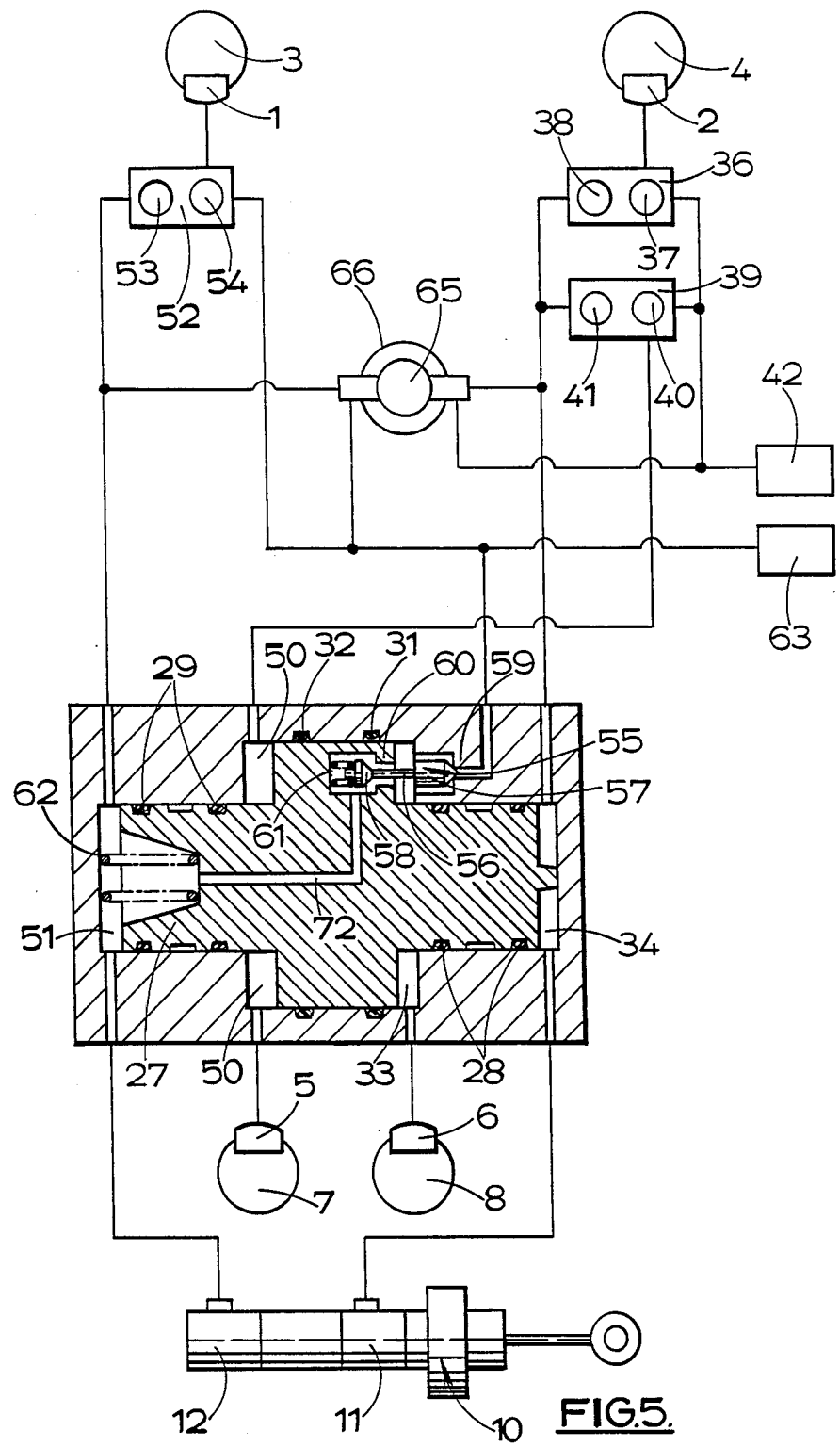
FIG. 5 is another layout similar to FIG. 3

The system shown in the layout of FIG. 5 is also similar to FIG. 3 except that the valve assembly 55 is housed in the intermediate piston portion 30 with the seating 59 disposed in an adjacent wall of the housing 21. The bore 72 leads from the chamber 51 to the valve assembly 75. The connections to and from the chambers 33 and 34 are reversed in comparison with FIG. 3. The construction and operation of the system is otherwise the same and corresponding reference numerals have been applied to corresponding parts.

I claim:

1. An hydraulic anti-lock braking system for a vehicle of the four-wheel type having front wheels, and rear wheels, and a brake on each said wheel, comprising a tandem hydraulic master cylinder for applying each said brake and having a primary pressure space, and a secondary pressure space, skid sensing means for sensing the behaviour of one of said braked wheels, an anti-lock modulator for modulating the supply of hydraulic fluid from said master cylinder to said brake on the said one wheel, first means defining a first expander chamber, second means defining a second expander chamber, and a copy valve, wherein said copy valve comprises a housing having a multi-stepped bore, a piston of complementary multi-stepped outline located in said bore, first and second separate inlet chambers defined in said housing between said piston and said bore, each connected to one of said pressure spaces of said master cylinder, first and second separate output chambers also defined in said housing between said piston and said bore, each said output chamber connected to a respective one of first and second brakes on wheels of a corresponding pair, with said first output chamber also connected to said first expander chamber, and a valve assembly adapted to control communication between said first inlet chamber and said first output chamber, and between said first output chamber and said first expander chamber, said second output chamber being connected to said second expander chamber through said anti-lock modulator.

2. A system according to claim 1, wherein said piston is so arranged that only a relatively small axial travel is required to operate said valve assembly and control the output pressure from said first output chamber.

3. A system according to claim 2, wherein said piston carries seals to define said input and output chambers between said piston and said bore, movement of said piston being accommodated by flexure of said seals.

4. A system according to claim 1, wherein said bore comprises a pair of first and second longitudinally extending spaced bore portions of substantially equal diameters and having adjacent ends, and a third bore portion of a diameter different to that of said first and second bore portions interconnecting said adjacent ends of said first and second bore portions, and wherein said piston comprises first, second and third piston portions which are complementary to, and which work in, said respective first, second and third portions of said bore.

5. A system according to claim 4, wherein said valve assembly is mounted in one of said piston portions, and said valve assembly comprises a valve member, a first seating in the housing which leads to the outlet side of said anti-lock modulator, a second seating on the said one piston portion itself, and axially spaced valve heads on said valve member for alternative engagement with said first and second seatings.

6. A system according to claim 5, wherein said valve assembly is mounted in one of said first and second piston portions.

7. A system according to claim 5, wherein said valve assembly is mounted in said third piston portion.

8. A system according to claim 4, wherein each said first and second piston portion is of greater diameter than the diameter of said third piston portion.

9. A system according to claim 4, wherein said third piston portion is of greater diameter than each of said first and second piston portions.

10. A system according to claim 1, wherein a first modulator and a second modulator is provided for each respective front wheel brake, a third modulator is provided for both rear wheel brakes, and a motor driven twin pump is provided to replenish fluid released from said brakes at the termination of an anti-lock cycle.

11. A system according to claim 10, wherein the said modulator for one front wheel is connected between said first inlet chamber and said first output chamber, and the said two other modulators are connected in parallel between said second inlet chamber and said second output chamber, and said twin pump is adapted to return fluid from said expander chambers to an appropriate master cylinder circuit during anti-lock control.

12. A system according to claim 11, wherein each said expander chamber is adapted to accommodate the volume of one front wheel brake and one rear wheel brake.

* * * * *